United States Patent
Hasegawa et al.

(10) Patent No.: US 11,152,018 B1
(45) Date of Patent: Oct. 19, 2021

(54) OPTIMIZED TAPE UNMOUNT OPERATION

(71) Applicant: INTERNATIONAL BUSINESS MACHINES CORPORATION, Armonk, NY (US)

(72) Inventors: Tohru Hasegawa, Tokyo (JP); Tsuyoshi Miyamura, Yokohama (JP); Shinsuke Mitsuma, Tokyo (JP); Hiroshi Itagaki, Yokohama (JP); Noriko Yamamoto, Tokyo (JP); Sosuke Matsui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/083,352

(22) Filed: Oct. 29, 2020

(51) Int. Cl.
| | |
|---|---|
| *G11B 5/008* | (2006.01) |
| *G11B 15/66* | (2006.01) |
| *G11B 15/43* | (2006.01) |
| *G11B 15/32* | (2006.01) |
| *G11B 5/86* | (2006.01) |
| *G06F 16/13* | (2019.01) |
| *G11B 20/12* | (2006.01) |
| *G11B 20/10* | (2006.01) |

(52) U.S. Cl.
CPC .......... *G11B 5/00813* (2013.01); *G06F 16/13* (2019.01); *G11B 5/86* (2013.01); *G11B 15/32* (2013.01); *G11B 15/43* (2013.01); *G11B 15/66* (2013.01); *G11B 20/1201* (2013.01); *G11B 2020/10851* (2013.01); *G11B 2020/10898* (2013.01)

(58) Field of Classification Search
None
See application file for complete search history.

(56) References Cited

U.S. PATENT DOCUMENTS

| | | | | |
|---|---|---|---|---|
| 8,373,941 | B2 * | 2/2013 | Bayang | G11B 27/36 360/71 |
| 9,063,666 | B2 | 6/2015 | Amir | |
| 9,235,347 | B2 | 1/2016 | Klein | |

(Continued)

FOREIGN PATENT DOCUMENTS

JP    2016099728 A    5/2016

OTHER PUBLICATIONS

Hasegawa et al., "Optimized Tape Unmount Operation", U.S. Appl. No. 17/083,355, filed Oct. 29, 2020.

(Continued)

*Primary Examiner* — Tan X Dinh
(74) *Attorney, Agent, or Firm* — Haley J. McClory

(57) ABSTRACT

A computer-implemented method for indexing a tape for unmounting from a tape drive. The computer-implemented method includes: receiving a request to unmount the tape from the tape drive, wherein the tape includes an index partition and a data partition, determining that an update to the tape is not reflected in any data index written in the data partition, appending a new data index at the end of the last written data file in the data partition, wherein the new data index includes information associated with the update to the tape, unthreading the tape from the tape drive, wherein unthreading the tape from the tape drive is performed at low tension writing a metadata index to an ancillary storage device, wherein the metadata index includes information associated with the update to the tape.

20 Claims, 9 Drawing Sheets

(56) References Cited

U.S. PATENT DOCUMENTS

| | | | |
|---|---|---|---|
| 9,348,837 B2 | 5/2016 | Iwanaga | |
| 9,997,193 B1* | 6/2018 | Hasegawa | G11B 27/107 |
| 10,078,466 B2 | 9/2018 | Hasegawa | |
| 10,423,336 B2 | 9/2019 | Abe | |
| 10,453,485 B1 | 10/2019 | Miyamura | |
| 10,572,170 B2* | 2/2020 | Abe | G11B 20/1201 |
| 10,580,438 B1* | 3/2020 | Biskeborn | G11B 5/10 |
| 10,679,658 B1* | 6/2020 | Winarski | G11B 15/00 |
| 10,726,868 B2 | 7/2020 | Biskeborn | |
| 10,802,724 B2* | 10/2020 | Hasegawa | G11B 15/689 |
| 10,818,314 B1* | 10/2020 | Miyamura | G11B 20/1886 |
| 10,964,350 B2* | 3/2021 | Iben | G11B 5/3909 |
| 11,010,104 B2 | 5/2021 | Hasegawa | |
| 2019/0187913 A1 | 6/2019 | Hasegawa | |
| 2021/0056996 A1* | 2/2021 | Bradshaw | G11B 5/70621 |

OTHER PUBLICATIONS

List of IBM Patents or Patent Applications Treated as Related. Filed Oct. 29, 2020, 2 pages.

IBM, "Sync operation", IBM Spectrum Archive Library Edition (LE) 24.1, downloaded from the Internet on Feb. 5, 2020, 4 pages, <https://www.ibm.com/support/knowledgecenter/en/STZMZN_2.4.1/ltfs_sync_operation_linux.html>.

Mell et al., "The NIST Definition of Cloud Computing", Recommendations of the National Institute of Standards and Technology, NIST Special Publication 800-145, Sep. 2011, 7 pages.

\* cited by examiner

OPTIMIZED TAPE UNMOUNT OPERATION

BACKGROUND

The present invention relates to the field of tape data storage systems, and more particularly, to tape data storage systems having data partitions.

In tape data storage, magnetic transducers read data from and write data onto magnetic tape. Data is written on the magnetic tape by moving the magnetic tape over a magnetic transducer, also known as a tape head, to a position over the media where the data is to be stored. The magnetic transducer generates a magnetic field, which encodes the data onto the magnetic tape. Data is read from the magnetic tape by similarly positioning the magnetic transducer and sensing the magnetic field of the magnetic tape. Read and write operations may be independently synchronized with the movement of the magnetic tape to ensure that the data can be read from and written to particular locations on the tape.

Tape data storage systems have experienced significant technological advances since their conception. Current tape data systems offer a cost-effective method of storing large volumes of data for long periods of time. As such, industries that create large amounts of data each day (e.g., media and entertainment, banking, and science sectors) often use tape as a storage option. As the volume of data increases exponentially, efforts have been made to increase tape usability (e.g., reducing data access times). Many of these efforts culminated in the development of Linear Tape Open (LTO) technology. While development and advances to LTO technology continue, LTO technology may generally be referred to as an open-format tape storage technology having a single reel of tape stored in a removable cartridge. LTO tape technology is configured to enable high data integrity, scalability, and interchangeability. LTO technology also provides additional optional formatting for users including, but not limited to, compression, Write Once Read Many (WORM), encryption, and Linear Tape Filing System (LTFS).

With the advent of LTFS, users can choose to partition LTO tapes into a Data Partition (DP) and an Index Partition (IP). With a LTFS, file data is generally only written in a DP and metadata (i.e., data describing the file data stored in the data partition) is written in an index partition. Accordingly, organizing or partitioning the tape in such a way enables the tape to be self-describing through the use of a file index in the index partition. This results in reducing the complexity of data management and data access time for tape storage. LTFS and similar systems, have made it possible to use magnetic tape data storage devices in a similar manner to other removable storage systems (e.g., USB flash drives or external hard disk drives).

SUMMARY

According to one embodiment of the present invention, a computer-implemented method for unmounting a tape from a tape drive is disclosed. The computer-implemented method includes receiving a request to unmount the tape from the tape drive. The computer-implemented method further includes the tape having an index partition and a data partition. The computer-implemented method further includes, determining that an update to the tape is not reflected in any data index written in the data partition. The computer-implemented method further includes, appending, in response to determining that the update to the tape is not reflected in any data index written in the data partition, a new data index at the end of the last written data file in the data partition, wherein the new data index includes information associated with the update to the tape. The computer-implemented method further includes, unthreading, after appending the new data index at the end of the last written data file in the data partition, the tape from the tape drive. The computer-implemented method further includes, winding the tape at a tension below a predetermined threshold from the end of the tape to the beginning of the tape, writing a metadata index to a secondary storage device, and unloading the tape from the tape drive.

According to another embodiment of the present invention, a computer program product for unmounting a tape from a tape drive is disclosed. The program instructions include instructions to receive a request to unmount the tape from the tape drive, wherein the tape has an index partition and a data partition. The program instructions further include instructions to determine that an update to the tape is not reflected in any data index written in the data partition. The program instructions further include instructions to append, in response to determining that the update to the tape is not reflected in any data index written in the data partition, a new data index at the end of the last written data file in the data partition, wherein the new data index includes information associated with the update to the tape. The program instructions further include instructions to unthread, after appending the new data index at the end of the last written data file in the data partition, the tape from the tape drive. The program instructions further include instructions to wind the tape at a tension below a predetermined threshold from the end of the tape to the beginning of the tape, writing a metadata index to a secondary storage device, and unloading the tape from the tape drive.

According to another embodiment of the present invention, a computer system for unmounting a tape from a tape drive is disclosed. The computer system includes one or more computer processors, one or more computer readable storage media, and program instructions stored on the computer readable storage media for execution by at least one of the one or more processors. The program instructions include instructions to receive a request to unmount the tape from the tape drive, wherein the tape has an index partition and a data partition. The program instructions further include instructions to determine that an update to the tape is not reflected in any data index written in the data partition. The program instructions further include instructions to append, in response to determining that the update to the tape is not reflected in any data index written in the data partition, a new data index at the end of the last written data file in the data partition, wherein the new data index includes information associated with the update to the tape. The program instructions further include instructions to unthread, after appending the new data index at the end of the last written data file in the data partition, the tape from the tape drive. The program instructions further include instructions to wind the tape at a tension below a predetermined threshold from the end of the tape to the beginning of the tape, writing a metadata index to a secondary storage device, and unloading the tape from the tape drive.

DETAILED DESCRIPTION

Figure 1:
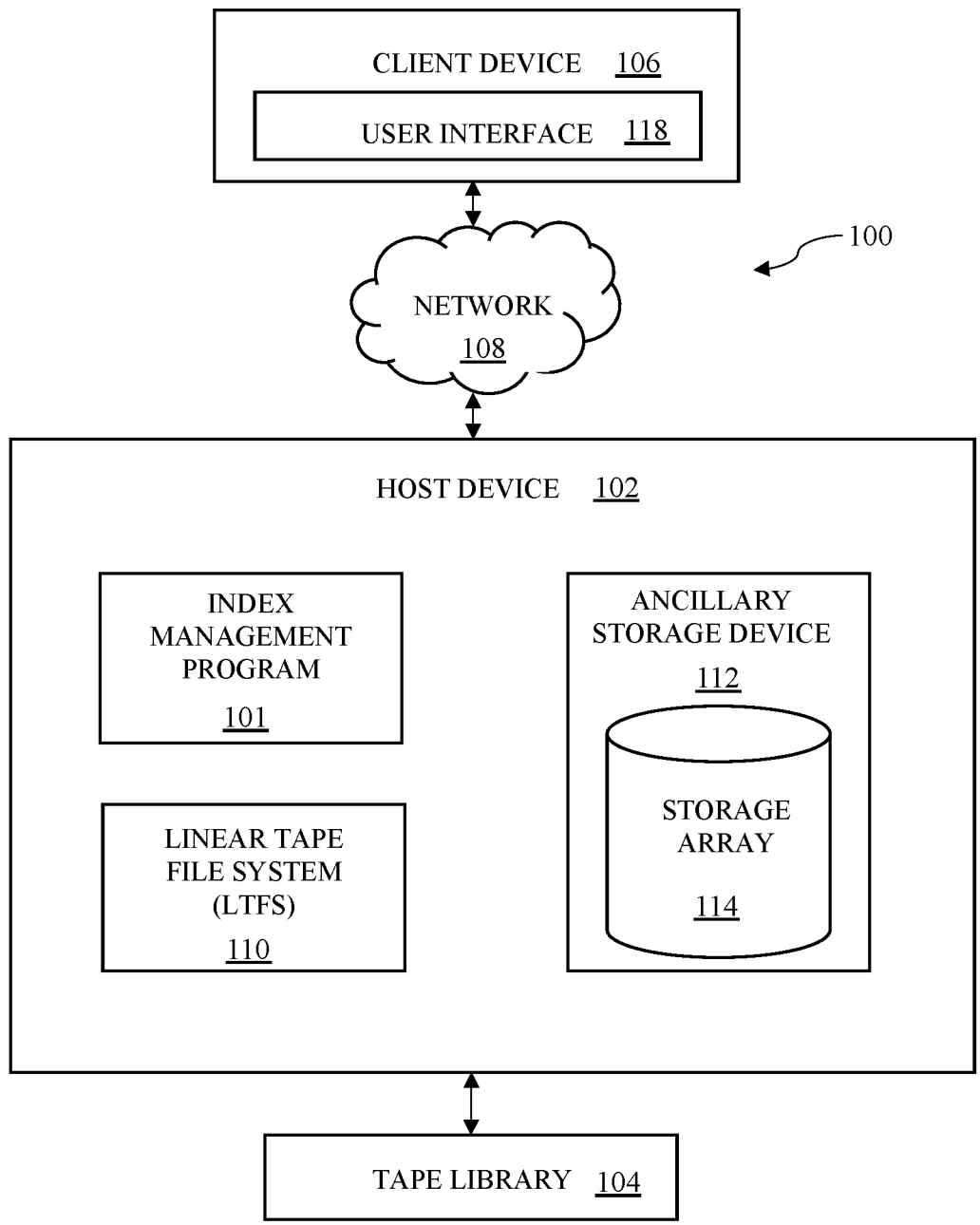
FIG. 1 is a functional block diagram of a computing environment, generally designated 100, suitable for operation of an index management program 101 in accordance with at least one embodiment of the present invention.

Linear tape open (LTO) is a magnetic tape data storage system that allows for a cost-effective method of using tape drives to store large amounts of data long term. While many magnetic tape data storage systems include traditional formatted tape, LTO storage systems have additional tape structures to enhance the data storage experience. In most LTO storage systems, these additional structures include dividing the full width of the tape into four data bands extending horizontally throughout the length of the tape. Each of the four data bands is separated by a narrow servo band on either side (for a total of 5 narrow servo bands). Servo bands provide location information to the tape head as it reads and writes data within a specific data band. Tape heads generally span the width of one data band and the adjacent (i.e., top and bottom) servo bands, and move in a vertical direction across the width of the horizontally oriented tape. Tape head position is controlled by the system of servo bands and the information encoded in each servo band during manufacturing. While the tape head moves vertically across the width of the tape, the tape can be moved horizontally along its length (i.e., by winding and unwinding the tape on reels) allowing the tape head to interact with different portions of the tape.

Often, LTO formatting specifies each servo band to have a specific number of nominal servo positions or elements (e.g., LTO formatting usually includes 6 servo elements). Each of the nominal servo positions located in each of the servo bands are separated at particular distances corresponding to the distance separating tracks within the data band. Generally, nominal servo positions are specific vertical positions within a servo band that extend the horizontal length of the tape alongside the data bands. Tape heads can be configured to have a plurality of read/write tape head elements (e.g., a set of 8, 16, or 32 data read/write tape head elements) and at least two servo read elements. Tape heads configured in such a manner are able to use the nominal servo positions of each data band's adjacent servo band to accurately read and write data. As the tape head and tape interact, the tape head receives location information from each of the data band's adjacent top and bottom servo bands. The LTO storage system then uses these two independent location information sources to accurately position the tape head in respect to a particular tape location.

LTO formatted tape generally uses a serpentine recording method to write data to each data band. The linear serpentine recording method uses the servo bands and the nominal servo positions to create tracks and wraps. A wrap is a set of tracks where each track of the set acts as a data sub-band. Within the wrap, one track is recorded in the physical forward direction and the other track in the physical reverse direction along the length of the tape. The number of tracks or wraps each data band has depends on the number of nominal servo positions the tape was designed to have. LTO tape systems are further designed to have longitudinal positions. Longitudinal positions are specific positions that extend vertically along the width of the tape and are dispersed at specific parts of the tape to provide position data (e.g., where the beginning of the tape and end of the tape are). Longitudinal positions can be configured using various tape elements and servo band elements, such as those referenced above.

During an exemplary initial writing operation in a LTO tape system, the tape head begins writing data near the beginning of the tape at a specific longitudinal position and track within a data band. This longitudinal position indicates the earliest portion of the tape where data can be written and is often referred to as Longitudinal Position 3 ($LP_3$). The tape head maintains a consistent vertical position as it writes data to the track. The location of the horizontally extending track is determined by the nominal servo positions within the specific data band and where data has previously been stored. The tape head then continuously writes data to the tape as the tape is moved horizontally, from the beginning of the tape (BOT) toward the end of the tape (EOT), or in the forward direction. When the tape head senses it is approaching the longitudinal position near the EOT, often referred to as Longitudinal Position 4 ($LP_4$), the tape head is moved to a new vertical position (consistent with the serpentine recording method) determined by nominal servo positions within the servo band. When the tape head is correctly positioned, the tape head begins writing data in the reverse direction (i.e., from the EOT toward the BOT) to form another track of data. The track writing data in the forward direction and the next track writing data in the reverse direction are often referred to as a wrap. When the tape head reaches $LP_3$, the tape head again vertically shifts (consistent with the serpentine recording method) to write data in a track, form the beginnings of a new wrap, toward the EOT (i.e., from the BOT toward the EOT). LTO is a sequential access medium, meaning that as new data is written to a track within the data band, the new data is added by appending the data object most recently written and stored on the tape. Depending on LTO tape specifications, a tape may have a plurality of wraps, each wrap capable of storing two tracks of data in the forward and reverse direction.

Since the advent of LTO tape technology, tape filing systems have undergone further formatting to control how data is stored and retrieved from tape memory. One beneficial development that increases the usability of LTO tape technology is the additional formatting known as partitioning. Tape partitioning includes segmenting tapes into different logical partitions that can be configured to support independent write operations without altering data stored on other partitions. LTO tape technology can be formatted to include two or more tape partitions that extend the length of the writable tape area. Partitions can be formatted to be any size, but since partitions are allocated as complete wraps, the smallest possible partition size is one wrap (i.e., a forward track and a reverse track). Each partition is separated from other tape partitions by a guard wrap. A guard wrap includes at least one entire wrap extending the length of the tape where data cannot be written. Guard wraps ensure that data written to one partition does not interfere with a neighboring partition data by securing a sufficient distance between the two partitions. While tape partitioning has many benefits, tapes having more than one partition can often have a reduction in performance. This reduction in performance is caused by an increase in tape movement, from one terminal end to the other, as the tape head performs longitudinal data seeking operations to locate specific data blocks for read/write operations on each of the different partitions. One possible solution includes further formatting LTO tape and the associated partitions to reduce tape movements associated.

One such tape filing system is the Linear Tape Filing System (LTFS). LTFS and other similar tape data storage systems utilize tape partitioning and LTO tape technology to make tape filing systems self-describing. LTFS formatted tape combines indexing techniques with partitioning to allow data to be easily and quickly recalled from memory without the tape drive having to read the entire tape beginning to end. Generally, LTFSs are partitioned into at least two partitions, an index partition and a data partition, each having the same longitudinal positions (i.e., $LP_3$ and $LP_4$) designating the area of tape where data can be written. The index partition is usually designed to have a small data volume of one or two wraps while the data partition's data volume consists of the remaining available wraps (e.g., the total available number of wraps on the tape, minus the index partition wraps and guard wraps).

LTFS formatted tapes utilize indexing and have two types of indexes, metadata indexes and data indexes. Each of the metadata index and data index include XML data structures that describe all data files, directory information and associated metadata for files recorded to the LTFS tape volume. For example, metadata index and data indexes can include file timestamps, file permissions, file names, and the longitudinal locations of each data extent holding part of the file content. A data extent is a set of one or more sequential logical blocks used to store file data. In some embodiments, metadata indexes and data indexes further include various file components (e.g., file markers and labels), generation numbers and pointers. Each time an LTFS formatted tape is mounted and modified (i.e. updated), a new generation of metadata index and data index are written to the tape to reflect these updates and modifications. A generation number is a non-negative integer assigned to the metadata index and data index that increases after each new generation of metadata index and data index are written to reflect the age of the new indexes compared to older indexes. Metadata index and data index can also include self pointers and back pointers. Self pointers record the partition volume and position to which metadata index or data index belongs to. Back pointers record the block position of the previous immediate generation of metadata index and/or data index present on the LTFS volume. If properly implemented, metadata indexes and data indexes should form an unbroken chain of back pointers.

Metadata indexes and data indexes, having the same generation number, contain the same information describing the tape volume and its contents (general examples previously provided). Metadata indexes are written to the index partition near the BOT at $LP_3$. This allows the metadata index to be one of the first instructions read once a tape cartridge, having a single reel, has been mounted to a tape drive. Having metadata index located near the BOT reduces tape movement by reducing the need for longitudinal data seeking operations, where the entire length of tape would need to be read before a full accounting of the tape's contents could be provided. While the index partition under some circumstances may include data files or data objects for quick file access, because of the small data volume available, the index partition is predominately used for recording different generations of metadata indexes. Each time the tape is modified in some way, a new metadata index is written to accurately reflect the information stored on the tape. The new metadata index is written over the old outdated metadata index, allowing the newest metadata index generation (i.e., metadata index with the highest integer) that reflects the most accurate or recent accounting of the LTFS tape volume contents to be located near the BOT. While a user may provide instructions designating how often a metadata index should be written, if the tape has been modified, a metadata index and a data index are usually written during "unmount" operations.

Data indexes are written to the data partition of the LTFS formatted tape volume. Because LTO tape technology is a sequential recording media, after the tape volume has been modified, a data index is written to append the most recently written data file or object in the data partition. Traditionally, data indexes, in contrast to metadata indexes, do not write over existing data or previous generations of data indexes. As previously mentioned, metadata indexes and data indexes having the same generation integer contain the same tape content describing information. While previous generations of metadata indexes are deleted as they are replaced, each generation of data index has a back pointer to its immediate predecessor. As a result, data indexes not only act as a form of redundancy in case of damage or failure of the metadata index, but also allow users to revert the tape volume, using the chain of back pointers, to a previous version of the data stored on the tape. Once the desired data modifications are completed and access to the tape is no longer necessary, the tape cartridge may be unmounted. In order for proper unmounting to occur, the data partition and index partition must be considered complete. Data partition and index partitions are only considered complete if they have been properly indexed with their respective metadata index and data index.

LTFS formatted tape has been integrated as a key sub-component for filing systems such as LTFS Library Edition (LTFS LE), LTFS Enterprise Edition (LTFS EE), and LTFS Single Drive Edition (LTFS SDE). While the present application often refers to the invention being used in a LTFS LE filing system, any filing system may be used that requires tape indexing.

Many industries, especially those that transfer and use large amounts of data, require the use of multiple LTFS formatted tapes. These LTFS tapes can be stored in tape libraries where each tape can be independently accessed by a user. A tape library can be defined as including all available tapes or a subset of the available tapes (e.g., a sub-library characterized by the data stored). As the number of tapes increases, the ability for a user to quickly access the correct data from a specific tape or having to switch from tape to another within the tape library can cause significant time delay. One solution includes using filing systems, such as LTFS LE that can provide users the ability to create a single file system mount point for a logical library. By creating the single file system mount point, each independent tape within the tape library becomes accessible to the user and can be viewed as if it were a subfolder or subdirectory.

In some embodiments, the number of tapes available exceeds the number of available tape drives. In these embodiments, some tapes within the tape library may not be continuously mounted. As a result, the tapes may be loaded/unloaded and mounted/unmounted from the tape drives by the system as different tapes are needed.

As discussed generally herein, magnetic tape storage is a low cost long term storage solution for data that need not be accessed frequently (e.g., data backups or archiving data). However, a trade-off exists in that read/write performance for tape storage is slower than that of more expensive (per byte stored) high speed storage devices (e.g., solid state drives and hard disk drives). In order to maximize the read/write performance of tape storage, tape media is typically wound and unwound at a high tension. However, winding tape at high tension can lead to the tape physically stretching. Physical stretching of the tape particularly affects tape media that is wound at high tension and stored or archived for long periods of time. Physical stretching of the tape media can result in data errors, data loss, and even tape breakage.

One possible solution to reducing the physical stretching of the tape is to perform "unthread" operations at low tension. Unthreading the tape from the tape drive at low tension reduces stretching of the tape media, but requires a significant amount of time to complete the operation. As a result, unthreading at low tension can be selectively chosen for situations when a tape is intended for long term storage.

Unthreading the tape at low tension for long term storage, while beneficial, can still result in significant time delay caused by the tape drive having to make multiple passes of the entire length of the tape. In systems such as LTFS LE, where multiple tapes are mounted within their respective tape drives, minimizing the potential time delay caused by "unthread" operations at low tension becomes paramount. As a result, efforts are being made to reduce tape movement and the need for the tape to make multiple lengthwise passes. Embodiments of the present invention reduce tape movement when performing an "unmount" operation by reducing the number of tape movements while still maintaining proper tape indexing (i.e., metadata index and data index, respectively) prior to unthreading the tape.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Referring now to various embodiments of the invention in more detail, FIG. 1 is a functional block diagram of a computing environment, generally designated 100, suitable for operation of an index management program 101 in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

Network computing environment 100 includes host device 102, tape library 104, and client device 106 interconnected over network 108. In embodiments of the present invention, network 108 can be a telecommunications network, a local area network (LAN), a wide area network (WAN), such as the Internet, or a combination of the three, and can include wired, wireless, or fiber optic connections. Network 101 can be any type of network, including, but not limited to storage area network ("SAN"), network attached storage ("NAS"), or any combination thereof. Network 108 provides block-level network access to storage, such as tape library 104 and storage array 114. Network 108 may include one or more wired and/or wireless networks that are capable of receiving and transmitting data, voice, and/or video signals, including multimedia signals that include voice, data, and video information. In general, network 108 may be any combination of connections and protocols that will support communications between host device 102, tape library 104, client device 106, ancillary storage device 112, storage array 114, and other computing devices (not shown) within computing environment 100.

In various embodiments of the present invention, host device 102 is a computing device that can be a standalone device, a management server, a web server, a mobile device, or any other electronic device or computing system capable of receiving, sending, and processing data. In other embodiments, host device 102 represents a server computing system utilizing multiple computers as a server system, such as in a cloud computing environment. In an embodiment, host device 102 represents a computing system utilizing clustered computers and components (e.g. database server computers, application server computers, web server computers, etc.) that act as a single pool of seamless resources when accessed within network computing environment 100. In general, host device 102 represents any programmable electronic device or combination of programmable electronic devices capable of executing machine readable program instructions and communicating with index management program 101, tape library 104, client device 106, ancillary storage device 112, storage array 114, linear tape file system (LTFS) 110, and other computing devices (not shown) within network computing environment 100 via a network, such as network 108.

Host device 102 includes ancillary storage device 112 and storage array 114. Ancillary storage device 112 may be any component capable of storing information. In addition, ancillary storage device 112 can configured to utilize any type of system software, such as, IBM General Parallel File System (GBFS) for distributing and managing data across a primary storage, such as storage array 114, that can act as a cache for an ancillary or backup storage, such as tape media stored in tape library 104. While reference is made to IBM-specific hardware and/or software components, it should be understood that aspects of the present invention may be applied equally to other file system technologies.

Host device 102 further includes linear tape file system (LTFS) 110. A LTFS is a file system that allows files stored on tape media (e.g., tape cartridges) in a tape library to be accessed in a similar fashion as files stored on a hard disk or flash drive. It requires both a specific format of data on the tape media and software to provide a file system interface to the data. Each LTFS formatted tape media in the tape library appears as a separate folder under the filesystem mount point. One of ordinary skill in the art will appreciate that applying a file system to a tape drive allows users to organize and search the contents of tape media as they would on hard disk, improving access time for data stored on tape media. For example, LTFS 110 can be an IBM Linear Tape File System—Library Edition (LTFS-LE) that allows LTFS volumes (i.e., tape media) to be used with a tape library, such as tape library 104. While reference is made to IBM-specific hardware and/or software components, it should be understood that aspects of the present invention may be applied equally to other linear tape storage technologies.

In various embodiments, host device 102 can migrate and/or recall data between a primary, high-speed storage media, such as a hard disk, and a secondary, slower speed storage media, such as a tape media. Accordingly, data may remain on storage array 114 until removal of the data is required, at which point, the data can be migrated to a tape media of tape library 104. For example, data can be migrated from a disk cache to a tape media based on an amount of free space on the disk cache falling below and/or equaling a predetermined threshold value. In another example, data can be migrated from a disk cache to a tape media based on length of time since a file was last accessed. In yet another example, data can be migrated from a disk cache to a tape media based on a user or system administrator selecting files for migration.

In various embodiments, host device 102 can receive read requests. Upon receiving a read request, host device can determine whether the data is stored in storage array 114. If the requested data is stored in storage array 114, the data can be read from a disk in storage array 114. However, if the requested data is stored on a tape media in tape library 104, host device 102 can recall (i.e., load) the data from the tape media (e.g., a magnetic tape) in tape library 104 to a disk of storage array 114, such that the data is read from the disk. In some embodiments, if the requested data is stored on tape media in tape library 104, host device 102 does not load data from the tape media to a hard disk. In these embodiments, information can be read from the tape media.

Tape library 104 can be an automated tape storage device that includes a plurality of tape drives for writing to and reading from tape media, such as, but not limited to, single-reel or two-reel magnetic tape cartridges. In an embodiment, tape library 104 can be an IBM TS3400™ Tape Library or an IBM TS3500™ Tape Library. While reference is made to IBM-specific hardware and/or software components, it should be understood that aspects of the present invention may be applied equally to other tape library technologies. In embodiments of the invention, tape library 104 can include a plurality of tape media stored in banks or groups of storage slots. For example, tape media may include, but is not limited to magnetic tape cartridges, magnetic tape cassettes, and optical tape cartridges. Tape library 104 can further include a plurality of slots to hold tape media (e.g., tape cartridges), a barcode reader to identify tape media and an automated method (e.g., a robot) for loading tape media.

Client device 106 can allow a user to access an application running on host device 102 and/or communicate with index management program 101 via a network, such as network 108. Client device 106 may be a laptop computer, a tablet computer, a netbook computer, a personal computer (PC), a desktop computer, a personal digital assistant (PDA), a smart phone, or any programmable electronic device capable of receiving, sending, and processing data. In general, client device 106 represents any programmable electronic device or combination of programmable electronic devices capable of executing machine readable program instructions and communicating with the various components and devices illustrated within computing environment 100, as well as other computing devices (not shown) within computing environment 100 via a network, such as network 108.

Client device 106 can include user interface 118. User interface 118 can provide an interface between client device 106 and host device 102, tape library 104, storage array 114, for example. In some embodiments, user interface 118 can be a graphical user interface (GUI) or a web user interface (WUI) and can display text, documents, web browser windows, user options, application interfaces, and instructions for operation, and includes the information (e.g., graphic, text, and sound) presented to a user and the control sequences the user employs to control the program. In some embodiments, user interface 118 can be mobile application software that provides an interface between client device 106 and the various components and devices depicted in computing environment 100, such as host device 102, tape library 104, and storage array 114.

Figure 2:
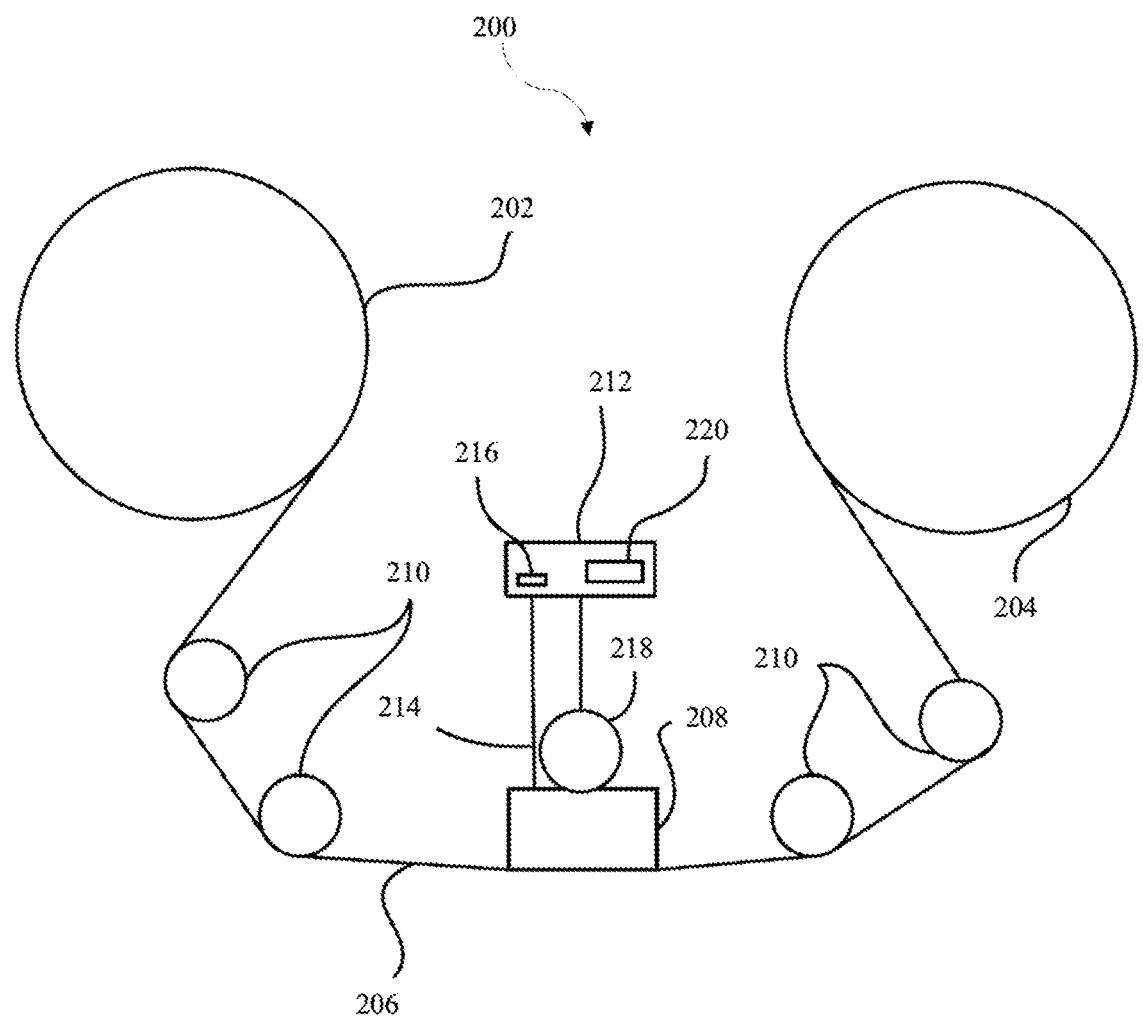
FIG. 2 is an exemplary simplified tape drive, generally designated 200, in accordance with at least one embodiment of the present invention.

FIG. 2 illustrates an exemplary tape drive, generally designated 200, in accordance with at least one embodiment of the present invention. While tape drive 200 shows one tape drive device, any tape drive configured to perform read/write operations on magnetic tape may be used. Furthermore, tape drive 200 can include any electronic device or combination of electronic devices, capable of executing computer readable program instructions and read/write operations on magnetic tape. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

As shown in FIG. 2, tape cartridge 202 and tape drive reel 204 are provided to support tape 206. Tape 206 can be any magnetic tape media configured to have at least two partitions (See FIG. 3). One or more of the reels may form part of a removable cartridge that is not necessarily part of tape drive 200. For example, tape cartridge 202 can be a single reel holding the complete wound length of tape 206. Tape cartridge 202 can be housed in a tape cartridge (not shown) and stored separately from tape drive 200 until needed. Tape drive 200 can include additional drive motor(s) to drive the tape cartridge 202 and the tape drive reel 204 to move tape 206 lengthwise in a horizontal direction over tape head 208 from BOT to EOT and the reverse. Tape head 208 can be any tape head capable of reading and/or writing data to tape 206. To read data stored at a particular location on tape 206, the tape drive 200 physically winds the tape between cartridge 202 and tape drive reel 204, moving tape 206 horizontally over tape head 208. This allows tape head 208 to directly interact in order read that specific piece of data stored at a particular location on tape 206. Guides 210 guide tape 206 across tape head 208. Tape head 208 is in turn coupled to a controller 212 via a cable 214. In some embodiments, controller 212 is a processor and controls any necessary subsystems of tape drive 200. In other embodiments, controller 212 controls head functions such as servo following, data writing and data reading. Controller 212 can include at least one servo channel and at least one data channel, each of which include data flow processing logic configured to process and/or store information to be written to and/or read from the tape 206. Controller 212 can utilize logic known in the art, as well as any logic disclosed herein, and can be considered as a processor for any of the descriptions of tape drives included herein, in various approaches. Controller 212 can be coupled to memory 216 of any known type, configured to store instructions executable by the controller 212. Moreover, controller 212 may be configured and/or programmable to perform or control some or all of the methodology presented herein. As a result, controller 212 can be considered to be configured to perform various operations by way of logic programmed into one or more chips, modules, and/or blocks; software, firmware, and/or other instructions being available to one or more processors; etc., and any possible combinations thereof.

Cable 214 includes read/write circuits to transmit data to tape head 208 to be written to tape 206 and to receive data read by tape head 208 from tape 206. Actuator 218 controls the positioning of tape head 208 relative to tape 206. In some embodiments, actuator 218 can control vertical movement of tape head 208 across the width of tape 206. An interface 220 may also be provided to enable communication between tape drive 200 and a host device (internal or external). Such communication may allow tape drive 200 to transmit and receive data, as well as receive instructions from index management program 101 and/or other programing, such as LTFS 110.

Tape drives move tape 206 over the surface of tape head 208 at high speeds. Moreover, tape head 208 is usually designed and positioned to minimize the spacing between tape 206 and tape head 208. Minimizing the spacing between tape 206 and tape head 208 allows the transducers of tape head 208 to have the read/write elements in near contact with tape 206 and ensures effective coupling of the magnetic field from the tape to the read/write elements (i.e., in order to optimize read/write performance).

In some embodiments, as referenced above, tape 206 can be stored on one or more reels inside a removable cartridge separate from tape drive 200 (i.e., unthreaded from tape drive 200). Because of the minimal spacing between tape 206 and tape head 208, stiction often occurs when the tape is idle in tape drive 200. Stiction can result from a buildup of static friction between the tape and tape head, affecting tape movement. When the tape begins moving, the stiction created between tape and tape head has been known to result in tape breakage rather than separate from the tape head. One solution to this problem is to unthread tape 206 from tape drive 200 when tape 206 is not in use. The ability to unthread tape 206 from tape drive 200 into a tape cartridge enables data to be stored for long periods with minimal hardware and device volume. Tape cartridges can be stowed in storage slots or in data storage libraries (e.g., archival storage).

Generally, a variety of operations can be executed on tape 206, including, but not limited to "loading," "unloading," "thread," "unthread," "mount," "unmount," "import" and "export." A tape cartridge may be "loaded" by inserting the tape cartridge into a tape drive and "unloaded" by removing the tape cartridge from the tape drive. Once loaded in tape drive 200, tape 206 may undergo a "thread" operation. "Thread" operations usually include physically passing the BOT of tape 206 (i.e., the outer most tape terminal of the wound tape on the tape cartridge reel) thorough tape drive 200 from tape cartridge 202 to tape drive reel 204 located in tape drive 200. After the "thread" operation is successfully completed, tape 206 is properly positioned over tape head 208 and can be "mounted."

"Mount" operations generally include making data files and file system structures stored on a tape 206 available for users to access via a storage system's file system (e.g., LTFS). When access to tape 206 is no longer required, tape 206 may be "unmounted." "Unmount" operations generally include storing information (e.g., metadata) and data to the tape medium for use in accessing files on the tape medium when the tape is next "mounted." "Unthread" operations generally include removing tape 206 from tape drive reel 204 and removing the tape 206 from tape drive 200. In addition to the operations discussed herein, many variations and modes of each operation exist and may be executed under specific circumstances. As such, some or all of these operations can be executed independently of the others. Alternatively, some or all of these operations can be executed concurrently and/or overlap.

"Import" operations generally include adding a LTFS formatted tape to the tape library. When a tape is imported to a tape library system, such as those found in LTFS LE, each tape cartridge becomes viewable to a user as a subfolder or subdirectory. "Export" operations generally include permanently removing a tape from the tape library (e.g., LTFS LE). During traditional "export" operations, the tape is removed and no longer viewable as a subfolder or subdirectory in the library system.

Figure 3:
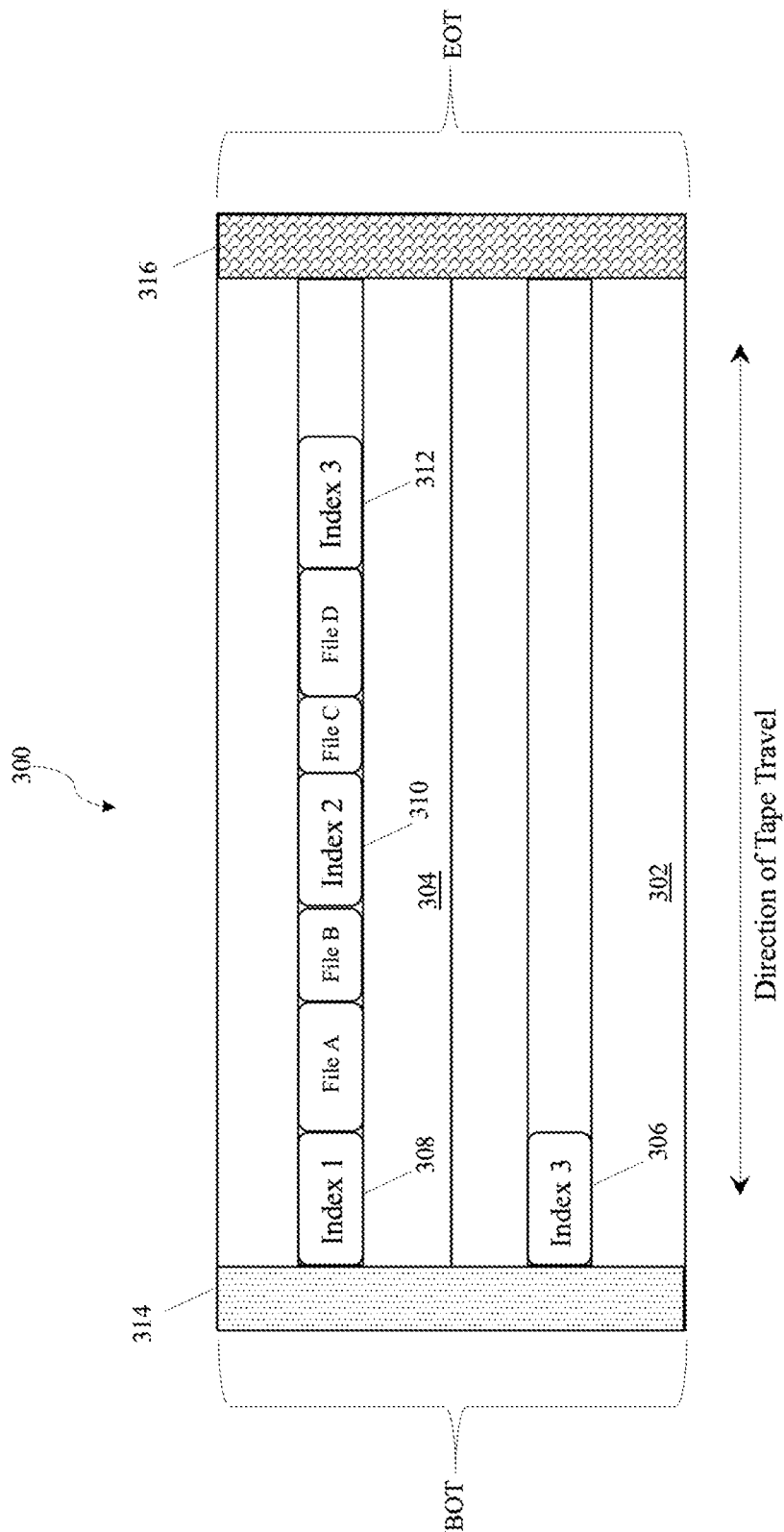
FIG. 3 is an exemplary sequential access magnetic tape having partitions, generally designated 300, in accordance with at least one embodiment of the present invention.

FIG. 3 is a block diagram illustrating an exemplary sequential access magnetic tape having partitions, generally designated 300, in accordance with at least one embodiment of the present invention. FIG. 3 provides an illustration of only one implementation and does not imply any limitations with regard to the environments in which different embodiments may be implemented. Many modifications to the depicted environment may be made by those skilled in the art without departing from the scope of the invention as recited by the claims. While LTFS formatted tape is referenced and used in regard to many embodiments of the disclosed invention, the disclosed invention may be applied to any tape filing systems having indexes written to two or more locations or partitions on a tape.

In an embodiment, partitioned magnetic tape 300, hereinafter referred to generally as tape, may be formatted in accordance with LTFS. Generally, LTFS format includes at least two partitions commonly referred to as index partition 302 and data partition 304. Index partition 302 is used to store indexes having metadata associated with data stored in the data partition. Metadata indexes 306, or those indexes written to index partition 302, can have a variety of metadata including, but not limited to, a directory of all the data files stored on tape 300 and/or file size. The LTFS format allows for metadata index 306 to be recorded in the index partition 302 beginning at longitudinal position 314 near the BOT. Longitudinal position 314, typically referred to as Longitudinal Position 3 ($LP_3$), is a vertical position on tape 300 indicating to tape drive 200 the "earliest" position near BOT where data can be written in both, index partition 302 and data partition 304. Data partition 304 has all of the data files written to tape 300 as well as a copy of the indexes comprising metadata. Indexes written in the data partition, for clarity are referred to herein as data indexes (i.e., data indexes: Index 1 308, Index 2 310, and Index 3 312 are written to data partition 304) while metadata indexes are those written to index partition 302 (i.e., Index 3 306).

Continuing with FIG. 3, in an exemplary writing operation, tape 300 has recently been updated to include File D in data partition 304. Tape 300 is a sequential access medium, meaning that as new data is written to data partition 304, new data is added by appending the data at the end of previously written data. After new data (i.e., File D) has been added to data partition 304, Index 3, having metadata regarding the update, is written in both the data partition 302 and the index partition 304. While in some embodiments metadata index 306 and data index 312 have the same information, in other embodiments metadata index 306 and data index 312 have different information.

Moreover, as index information is updated, an updated metadata index 306 (i.e., Index 3) overwrites the previous version of the metadata index (Index 2, not depicted in FIG. 3) including outdated information in index partition 302 to correctly reflect the most current tape data accessible to a user. As previously discussed each successive generation of index (i.e., metadata index and data index) are given a non-zero positive integer greater than the previous index number. By overwriting the outdated metadata index (Index 2), the new metadata index 306 (i.e., Index 3) is approximately located at $LP_3$ 314 in the index partition near the BOT. Writing metadata index 306 at $LP_3$ or near the BOT allows metadata index 306 to be easily read when tape 300 is "mounted" and/or "threaded" into tape drive 200. This enables a user to quickly receive information regarding data stored on the tape and, once user selects a file to be read/written, for the file to be quickly found using the information stored in metadata index 306.

As further depicted in FIG. 3, updated data index 312 (i.e., Index 3) is written in data partition 304 and is appended to the most recently recorded data files. In most embodiments, data and indexes written in data partition 304 cannot be overwritten. As a result, all previously written, but outdated data indexes 308 and 310 (i.e., Index 1 and Index 2, respectively) remain stored on tape 300 in data partition 304. This process can be viewed in FIG. 3, where all versions of data indexes 308, 310, 312 (i.e., Index 1, Index 2, Index 3, respectively) as well as data File A, File B, File C, File D are recorded and stored in data partition 304 of tape 300. Although data index 308 (Index 1) and data index 310 (Index 2) are old indexes (i.e., outdated), because information is written to tape by appending it to the end of the previously written data as described above, these old indexes remain stored on the tape 300 in the data partition 304 without being overwritten. Data and data indexes continue to be written to data partition 304, in $LP_3$ 314 toward Longitudinal Position 4 316 ($LP_4$) located near EOT. Once the written data approaches $LP_4$ 316, tape head 200 shifts vertically (consistent with the serpentine recording method) and continues writing data from $LP_4$ 316 toward $LP_3$ 314.

As discussed herein, old data indexes interweaved between data, can include a chain of back pointers to older data index versions. In other words, if a user decides they want to revert to an earlier version of data stored on tape 300, LTFS can navigate back through the old data indexes (e.g., Index 2 and Index 1) written in data partition 302 and make that version of tape data available to the user. Additionally, by writing an updated index in both index partition 302 and data partition 304 (i.e., metadata index and data index), tape 300 may be mounted using the metadata recorded in data index 312 and can act as a backup option.

Traditional magnetic tape storage devices have combined winding and unwinding tape at high speeds with high tension to reduce the time necessary to access particular tape locations for data read or write access. Winding and unwinding at high speeds and high tension allows the tape to be quickly and properly positioned in relation to the tape head, even when required data files are located at disparate tape terminals. In order to act as a practical storage medium, data stored on tape media must be quickly assessible. As a result, reducing the speed or tension of the tape in the tape drive can result in significant operational delays and reduce usability.

As discussed generally herein, magnetic tape storage devices can be used to archive data for long term storage. In various magnetic tape data storage devices, winding and unwinding the tape at high tension to read/write data before storing the tape for long term storage can cause the tape to physically stretch. When this type of tape-wear occurs, data can form errors or may be lost in its entirety. Because LTFS formatted tape drives require two different indexes to be written at two different locations on the tape, possibly located on opposite tape terminals, special care is taken. To accommodate the need for high speed and high tension, but also taking into consideration the aforementioned issues of tape-ware associated with winding tape at high tension, specific "unthread" operations have been developed. These "unthread" operations allow for the tape to be wound onto the cartridge reel (See FIG. 2) at a low tension.

In situations where a LTFS formatted tape is intended for long term storage, particular steps should be taken during the "unmount" operation but before the "unthread" operation to ensure the tape is properly indexed. Indexing often occurs during "unmount" operations if the tape has been modified (e.g., updating or altering of files and/or metadata) since it was mounted. During "unmount" operations, the position of tape head 208 in relation to tape 300 may be located at any longitudinal position on tape 300. The position of tape head 208 in relation to tape 300 is likely dependent on the most recent read/write operation. If tape head 208 most recently wrote new data (e.g., File D) to tape 300, then during an "unmount" operation tape head 208 may be proximately positioned to the tape location where most recently added data was written. If tape head 208 most recently read written data, then during an "unmount" operation tape head 208 may be positioned, in relation to tape 300, randomly along the length of tape 300.

Once an "unmount" operation has been initiated and it has been determined that tape 300 has been modified since mounting, tape head 208 is positioned to the most recently updated portion of data partition 304 and data index 312 (e.g., Index 3) is written in an appending manner. Data index 312 should be written to tape 300 consistent with the serpentine recording method (i.e., appending the most recently written files). A combination of controlling the horizontal movement of tape 300 (via cartridge 202 and a tape drive reel 204) and the vertical movement of tape head 208 across the width of tape 300, allows tape head 208 to be precisely positioned at the appropriate data band and track/wrap position (not shown).

After data index 312 is written, tape 300 is moved horizontally until tape head 208 is positioned proximate to $LP_3$ 314 near BOT of index partition 302. Once tape head 208 is properly positioned to $LP_3$ 314, tape head 208 overwrites old/outdated metadata Index 2 (not shown) with new/updated metadata index 306 (e.g., Index 3). As discussed above, controlling the horizontal movement of tape 300 and the vertical movement of tape head 208 across the width of tape 300 allows tape head 208 to be precisely positioned. When metadata index 306 overwrites outdated metadata index at $LP_3$ 314 near BOT, approximately the complete length of tape 300 is wound with high tension on tape cartridge 202 (a single reel housed inside the removable cartridge (not shown) that is considered separate from tape drive 200).

The benefits of unthreading tape 300 at low tension are often achieved only if the entire reel of tape is wound at low tension on tape cartridge 202 (i.e., the tape cartridge reel). After both data index 312 and metadata index 306 are properly written, tape 300 begins an "unthread" operation at low tension. To properly "unthread" tape 300 from tape drive 200, tape 300 should be horizontally moved and repositioned in such a way as the EOT can interact with tape head 208 and/or other tape drive 200 components. This repositioning requires tape 300 to traverse its entire tape length, from the BOT (where the metadata index 306 was last written) to the EOT. Initially, immediately after writing metadata index 306, tape cartridge 202 holds the bulk of tape 300. As tape 300 is moved horizontally, to allow tape head 208 to interact with EOT, the bulk of tape 300 begins to shift to tape drive reel 204. Once the EOT has been reached, tape 300 is then unthreaded from tape drive 200 and wound at low tension on to tape cartridge 202. After the "unthread" operation is complete, the "unmount" operation can conclude and the tape cartridge, housing tape 300 (with the most external tape terminus being the BOT) can be ejected from tape drive 200.

While performing an "unthread" operation at low tension during an "unmount" operation is effective at reducing tape stretch and degradation, the process can cause significant time delays. As generally discussed above, tape head 208 is located close to $LP_3$ 314 near BOT. In order to begin the "unthread" operation, tape 300 is wound between tape cartridge reel 202 and tape drive reel 204 from $LP_3$ 314 (near BOT) to $LP_4$ 316 (near EOT). The "unthread" operation then winds tape 300 from EOT to BOT. The time required to span the length of tape 300 multiple times, in addition to the time delay resulting from winding the tape at low tension, can add a significant time delay during "unmount" operations. Embodiments discussed below in regard to FIG. 4A and FIG. 4B, provide solutions to reduce the time of the aforementioned process by reducing potential tape movement during an unmount operation.

Figure 4A:
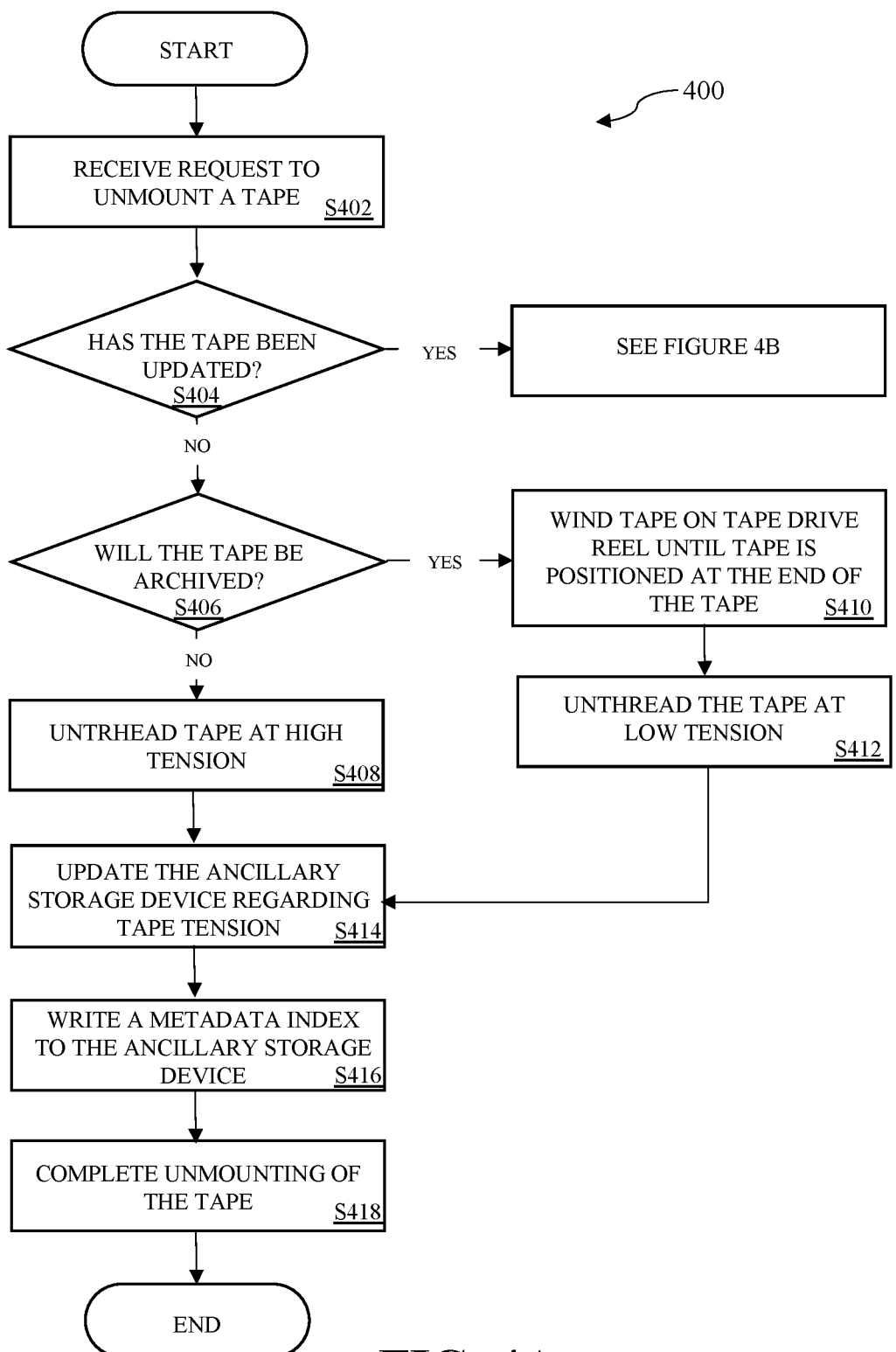
FIG. 4A is a flowchart diagram depicting operational steps by index management program 101, generally designated 400, for indexing partitioned tape during an "unmount" operation in accordance with at least one embodiment of the present invention.

FIG. 4A is a flowchart diagram depicting operational method steps performed by index management program 101, generally designated 400, for a partitioned tape during "unmount" operations in accordance with at least one embodiment of the present invention. These operational steps performed by index management program 101 allow for a tape, having at least two partitions, an index partition and a data partition (e.g., LTFS formatted tape), to be correctly indexed during an "unmount" operation. It should be appreciated that the steps as described in FIG. 4A, not only reduces physical stretching of the tape, but can also reduce time delays caused by transitioning the tape from the BOT to the EOT multiple times during traditional "unmount" operation.

In some embodiments, method 400 begins at operational step S402, where index management program 101 receives a request to "unmount" the tape from a tape drive. Method 400 proceeds to decision step S404, where index management program 101 determines if the tape has been updated. As discussed generally herein, a tape is considered updated if any of the tape contents metadata and/or file data, of either the index partition or the data partition, have been altered or modified since the tape was previously indexed.

Figure 4B:
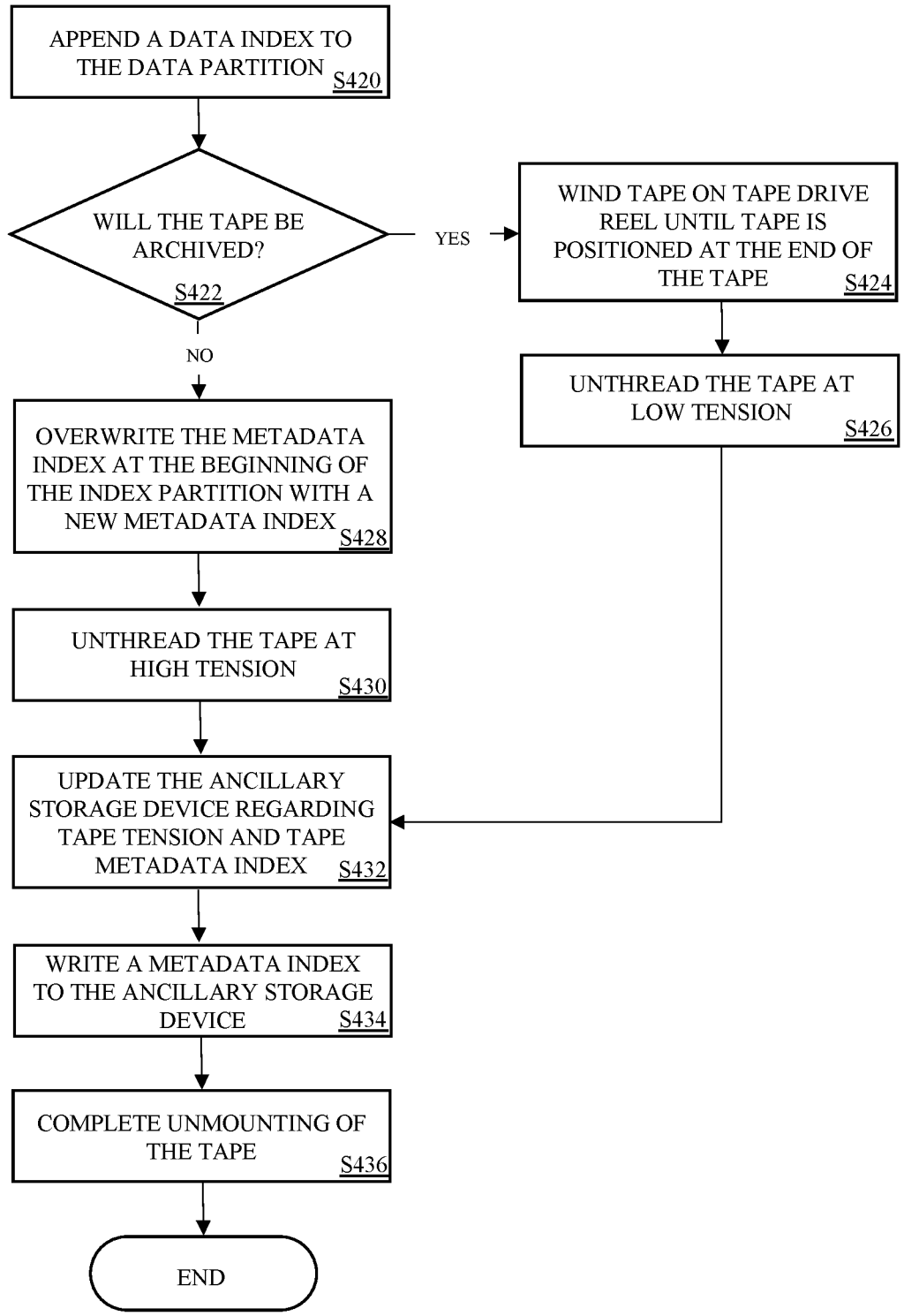
FIG. 4B is a flowchart diagram depicting operational steps by index management program 101, stemming from decision step S404 "NO" branch of FIG. 4A in accordance with at least one embodiment of the present invention.

If, at decision step S404, index management program 101 determines that the tape has been updated (decision step "YES" branch), method 400 proceeds to operational step S420 of FIG. 4B.

If, at decision step S404, index management program 101 determines that the tape has not been updated (decision step "NO" branch), method 400 proceeds to decision step S406.

At decision step S406, index management program 101 determines if the tape will be archived. In some embodiments, index management program 101 receives external input (e.g., from a user) indicating the tape should be archived. In other embodiments, index management program 101 records prior tape use parameters, such as how often the data on the tape is accessed, to determine whether the tape should be archived, independent of external input. A tape slated to undergo archiving generally refers to tapes that are not intended for immediate use.

If, at decision step S406, index management program 101 determines that the tape will be archived (decision step "YES" branch), method 400 proceeds to operational step S410 where the tape is wound on the tape drive reel until the tape is positioned at the end of the tape.

If, at decision step S406, index management program 101 determines that the tape will not be archived (decision step "NO" branch), method 400 proceeds to operational step S408 where the tape is unthreaded at high tension. As discussed herein, operations performed at high tension can be performed at high speed. By performing actions at high speed and high tension, index management program 101 can minimize potential time delays.

At operational step S410, index management program 101 has determined the tape will be archived and winds the tape on the tape drive reel until the tape is positioned at the end of the tape in preparation for operational step S412.

At operational step S412, index management program 101 performs an "unthread" operation at low tension. As discussed herein, tape wound at low tension can reduce undesirable stretching of tape. Typical "unthread" operations that wind tape with low tension require a significant amount of time to complete the operation. As a result, "unthread" operations performed at low tension are generally reserved for tapes intended for archival.

Method 400 proceeds to operational step S414. At operational step S414, index management program 101 updates the ancillary storage device to memorialize whether the tape is wound on the cartridge real at a high or low tension.

Method 400 proceeds to operational step 416. At operational step S416, index management program 101 writes a metadata index to the ancillary storage device.

Method 400 proceeds to operational step 418. At operational step 418, index management program completes the "unmount" operation of the tape.

FIG. 4B is a flowchart diagram continuing the operational method steps performed by index management program 101 initiated in FIG. 4A and stemming from decision step S404 "YES" branch. FIG. 4B provides an illustration of one implementation and does not imply any limitation with regard to the environments in which different embodiments may be implemented. Many modifications may be made to the depicted method by those skilled in the art without departing from the scope of the invention as recited by the claims.

The method 400 proceeds to operational step S420. At operational step S420, index management program 101 repositions the tape head to the most recently written data object in the data partition and writes a data index appending the most recently written data object to represent the current contents of the tape.

The method 400 proceeds to decision step S422. At decision step S422, index management program 101 determines if the tape should be archived.

If, at decision step S422, index management program 101 determines that the tape will be archived (decision step "YES" branch), method 400 proceeds to operational step S424 where the tape is wound on to the tape drive reel until the tape is positioned at the end of the tape. Once the tape is positioned at the end of the tape, index management program 101 proceeds to step S426. At step S426, index management program 101 performs an "unthread" operation at low tension. Once the "unthread" operation is complete the entire length of the tape is wound on the cartridge reel. Method 400 then proceeds to operational step S432.

If, at decision step 422, index management program 101 determines that the tape will not be archived (decision step "NO" branch), method 400 proceeds to operational step S428. At step S428, index management program 101 overwrites an outdated metadata index near the BOT at LP$_3$ with a new metadata index representing the current contents of the tape. Method 400 proceeds to step S430. At step S430, index management program 101 performs an "unthread" operation on the tape at high tension. During this "unthread" operation, the tape is unthreaded from the tape drive and the entire length of the tape is wound onto the cartridge reel.

Method 400 proceeds to step S432. At step S432, index management program 101 updates the ancillary storage device to reflect what tension (i.e., high or low tension) the tape has been wound onto the cartridge reel and if the tape contains a metadata index that reflects the current contents of the tape in the index partition.

Method 400 proceeds to step S434. At step S434, index management program 101 writes a metadata index to the ancillary storage device.

Method 400 proceeds to Step S436. At step S436, index management program 101 completes the "unmount" operation of the tape and method 400 ends.

As discussed herein, index management program 101 reduces tape movement, particularly when data is added to the tape and the tape is intended for archival. By writing a metadata index to the ancillary storage device, the tape no longer has to be wound to the BOT before then again winding to the opposite EOT terminal before unthreading. This ensures that usability and accessibility are maintained while the physical stretching of the tape is reduced. However, potential issues can arise when a tape, without a current metadata index, is exported from a tape library. As such, special care should be taken to ensure tapes exported from tape libraries have a current metadata index.

Figure 5:
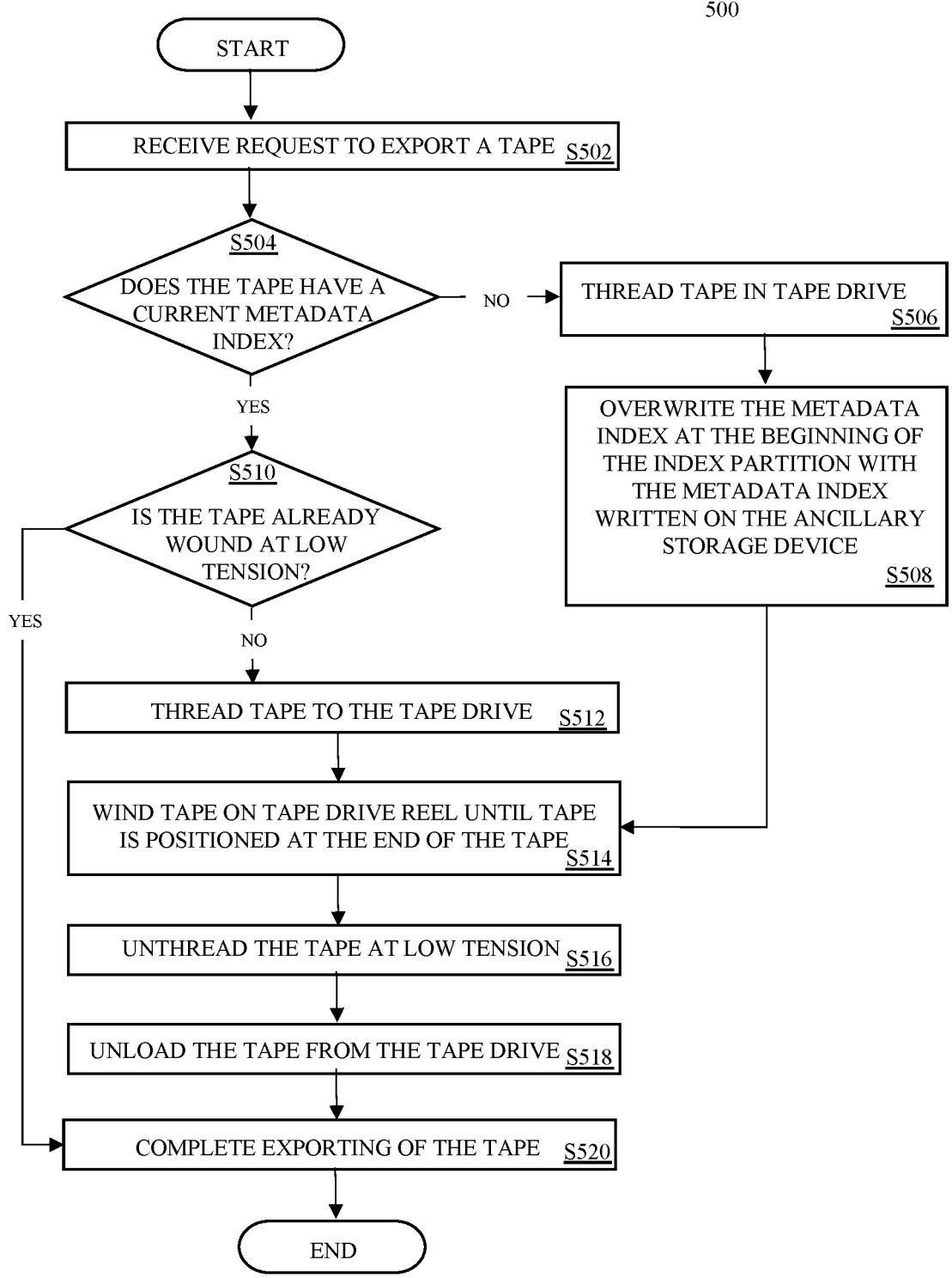
FIG. 5 is a flowchart diagram depicting operational steps by index management program 101 for indexing partitioned tape during an "export" operation in accordance with at least one embodiment of the present invention.

FIG. 5 is a flowchart diagram depicting operational method steps performed by index management program 101, generally designated 500, for a partitioned tape during "export" operations in accordance with at least one embodiment of the present invention. These operational steps performed by index management program 101 allow for a tape, having at least two partitions, an index partition and a data partition (e.g., LTFS formatted tape), to be correctly indexed during an "export" operation. It should be appreciated that the steps as described in FIG. 5, not only reduces physical stretching of the tape, but can also reduce time delays caused by transitioning the tape from the BOT to the EOT multiple times during traditional "export" operation.

In some embodiments, method 500 begins at operational step S502, where index management program 101 receives a request to "export" the tape from a tape library. Method 500 proceeds to decision step S504, where index management program 101 determines if the tape has a current metadata index. In some embodiments, index management program 101 can retrieve this information from the ancillary storage device. In other embodiments, index management program 101 can compare the generation numbers of the data index to the generation number of that metadata index currently written to the index partition of the tape.

If, at decision step S504, index management program 101 determines that the tape does not have a current metadata index (decision step "NO" branch), method 500 proceeds to operational step S506. At step S506, index management program 101 loads and/or threads the tape into the tape drive. Method 500 proceeds to operational step S508. At step S508, index management program 101 overwrites the outdated metadata index near the BOT in the index partition with a current metadata index (i.e., a metadata index representing the current contents of the tape). For example, index management program 101 retrieves the current metadata index associated with the tape previously written to the primary storage device, such as storage array 114. After the current metadata index has been written to the tape, method 500 proceeds to S514.

If, at decision step S504, index management program 101 determines that the tape has a current metadata index (decision step "YES" branch), method 500 proceeds to decision step S510.

At decision step S510, index management program 101 determines if the tape was wound with low tension on the cartridge reel.

If, at decision step S510, index management program 101 determines that the tape was wound with low tension on the cartridge reel (decision step "YES"), method 500 proceeds to step S520, where the "export" operation is completed.

If, at decision step S510, index management program 101 identifies that the tape was not wound with low tension on the cartridge reel (decision step "NO"), then method 500 proceeds to step S512. At S512, index management program 101 loads and/or threads the tape into the tape drive.

Method 500 proceeds to S514. At step S514, index management program 101 winds the tape onto the tape drive reel until the tape is positioned at the EOT. Once the tape is positioned at the EOT, method 500 proceeds to step 516.

At step S516, index management program 101 performs an "unthread" operation at low tension. After the "unthread" operation is completed, method 500 proceeds to step S518 where the tape is unloaded from the tape drive.

Method 500 proceeds to step S520. At step S520, index management program 101 completes the "export" operation on the tape from the tape library and method 500 ends.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

A cloud computing environment 610 is depicted. As shown, cloud computing environment 610 includes one or more cloud computing nodes 600 with which local computing devices used by cloud consumers, such as, for example, personal digital assistant (PDA) or cellular telephone 600A, desktop computer 600B, laptop computer 600C, and/or automobile computer system 600N may communicate. Nodes 600 may communicate with one another. They may be grouped (not shown) physically or virtually, in one or more networks, such as Private, Community, Public, or Hybrid clouds as described hereinabove, or a combination thereof.

Figure 6:
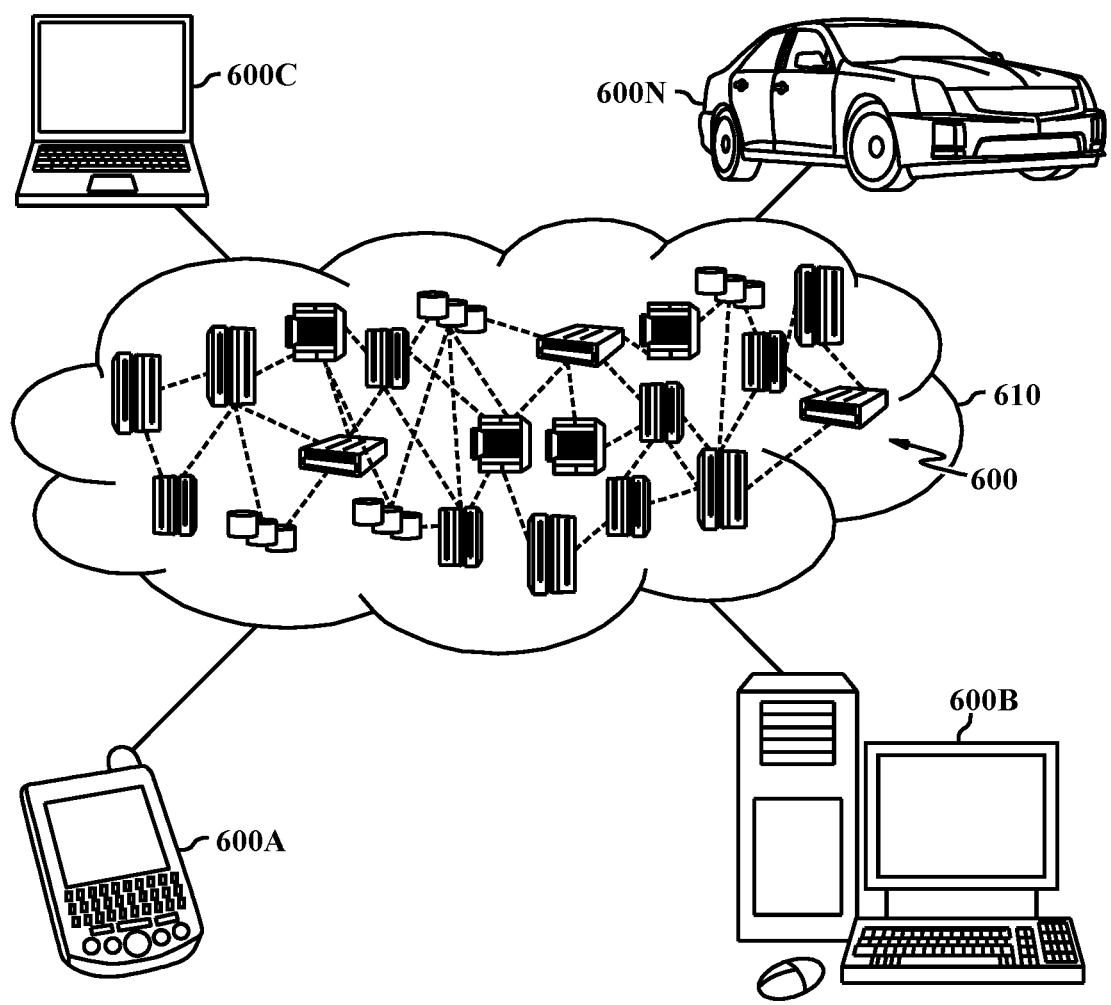
FIG. 6 illustrates a cloud computing environment, in accordance with embodiments of the present disclosure.

This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
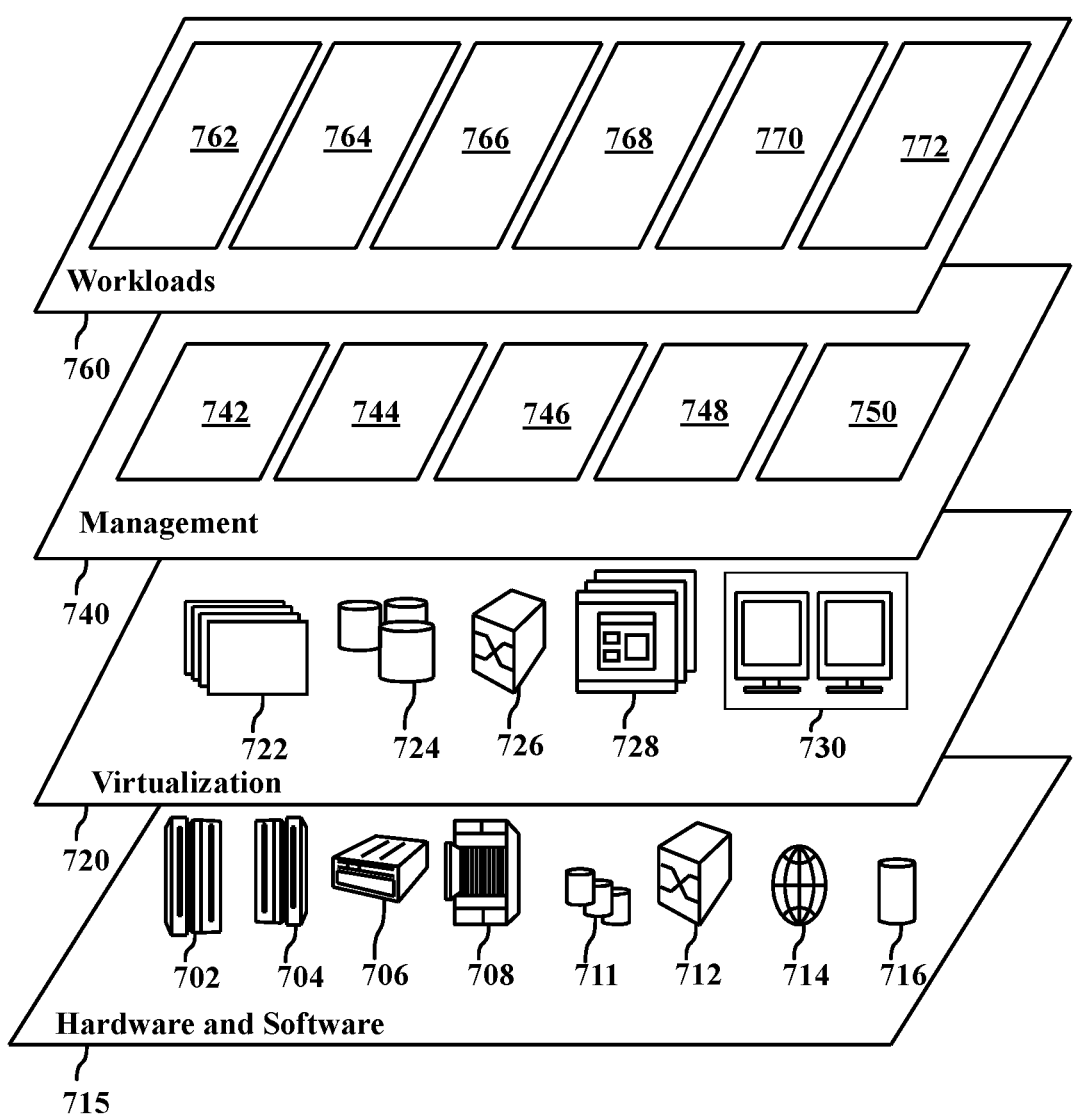
FIG. 7 illustrates abstraction model layers, in accordance with embodiments of the present disclosure.

FIG. 7, illustrated is a set of functional abstraction layers provided by cloud computing environment 610 (FIG. 6) is shown. It should be understood in advance that the components, layers, and functions shown in FIG. 7 are intended to be illustrative only and embodiments of the disclosure are not limited thereto. As depicted below, the following layers and corresponding functions are provided.

Hardware and software layer 715 includes hardware and software components. Examples of hardware components include: mainframes 702; RISC (Reduced Instruction Set Computer) architecture based servers 704; servers 706; blade servers 708; storage devices 711; and networks and networking components 712. In some embodiments, software components include network application server software 714 and database software 716.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730.

In one example, management layer 740 may provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment may be utilized.

Examples of workloads and functions which may be provided from this layer include: mapping and navigation 762; software development and lifecycle management 764; virtual classroom education delivery 766; data analytics processing 768; transaction processing 770; and automatic visualization generating 772.

Figure 8:
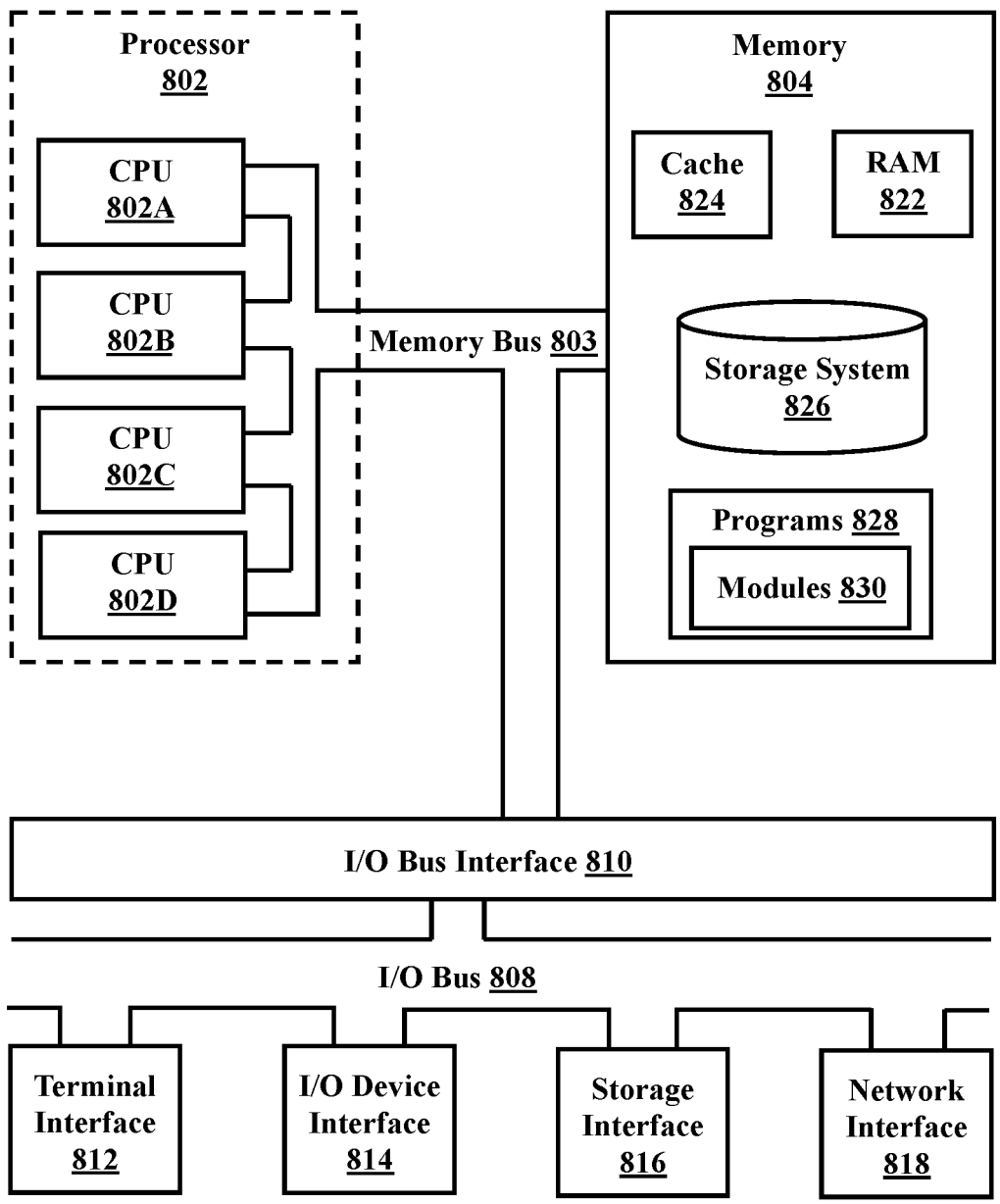
FIG. 8 illustrates a high-level block diagram of an example computer system that may be used in implementing one or more of the methods, tools, and modules, and any related functions, described herein, in accordance with embodiments of the present disclosure.

FIG. 8, illustrated is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the Processor 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

What is claimed is:

1. A computer-implemented method for unmounting a tape from a tape drive, comprising:
    receiving a request to unmount the tape from the tape drive, wherein the tape includes an index partition and a data partition;
    determining that an update to the tape is not reflected in any data index written in the data partition;
    appending, in response to determining that the update to the tape is not reflected in any data index written in the data partition, a new data index at the end of the last written data file in the data partition, wherein the new data index includes information associated with the update to the tape;
    unthreading, after appending the new data index at the end of the last written data file in the data partition, the tape from the tape drive, wherein unthreading the tape from the tape drive comprises:
        winding the tape to the end of the tape; and
        winding the tape at a tension below a predetermined threshold from the end of the tape to the beginning of the tape; and
    writing a metadata index to an ancillary storage device, wherein the metadata index includes information associated with the update to the tape.

2. The computer-implemented method of claim 1, further comprising:
    receiving a request to export file system data associated with the tape and stored on the ancillary storage device; and determining whether a current metadata index written to the index partition of the tape includes information associated with the update to the tape.

3. The computer-implemented method of claim 2, further comprising:
responsive to determining that the current metadata index written to the index partition of the tape does not include information associated with the update to the tape and prior to exporting the file system data stored on the ancillary storage device:
loading the tape to the tape drive; and
overwriting the current metadata index written to the index partition of the tape with the metadata index stored on the ancillary storage device.

4. The computer-implemented method of claim 2, further comprising:
deleting, responsive to determining that the current metadata index written to the index partition of the tape does include information associated with the update to the tape, the metadata index from the ancillary storage device.

5. The computer-implemented method of claim 1, wherein the ancillary storage device is a hard disk drive.

6. The computer-implemented method of claim 1, wherein winding the tape to the end of the tape includes winding the tape onto at least one tape drive reel.

7. The computer-implemented method of claim 1, wherein winding the tape at a tension below a predetermined threshold from the end of the tape to the beginning of the tape includes winding that tape onto at least one tape cartridge reel.

8. A computer program product for unmounting a tape from a tape drive, the computer program product comprising one or more computer readable storage media and program instructions stored on the one or more computer readable storage media, the program instructions including instructions to:
receive a request to unmount the tape from the tape drive, wherein the tape includes an index partition and a data partition;
determine that an update to the tape is not reflected in any data index written in the data partition;
append, in response to determining that the update to the tape is not reflected in any data index written in the data partition, a new data index at the end of the last written data file in the data partition, wherein the new data index includes information associated with the update to the tape;
unthread, after appending the new data index at the end of the last written data file in the data partition, the tape from the tape drive, wherein unthreading the tape from the tape drive comprises instructions to:
wind the tape to the end of the tape; and
wind the tape at a tension below a predetermined threshold from the end of the tape to the beginning of the tape; and
write a metadata index to an ancillary storage device, wherein the metadata index includes information associated with the update to the tape.

9. The computer program product of claim 8, further comprising:
receive a request to export file system data associated with the tape and stored on the ancillary storage device; and
determine whether a current metadata index written to the index partition of the tape includes information associated with the update to the tape.

10. The computer program product of claim 9, further comprising:
responsive to determining that the current metadata index written to the index partition of the tape does not include information associated with the update to the tape and prior to exporting the file system data stored on the ancillary storage device:
load the tape to the tape drive; and
overwrite the current metadata index written to the index partition of the tape with the metadata index stored on the ancillary storage device.

11. The computer program product of claim 9, further comprising:
delete, responsive to determining that the current metadata index written to the index partition of the tape does include information associated with the update to the tape, the metadata index from the ancillary storage device.

12. The computer program product of claim 8, wherein the ancillary storage device is a hard disk drive.

13. The computer program product of claim 8, wherein winding the tape to the end of the tape includes winding the tape onto at least one tape drive reel.

14. The computer program product of claim 8, wherein winding the tape at a tension below a predetermined threshold from the end of the tape to the beginning of the tape includes winding that tape onto at least one tape cartridge reel.

15. A computer system for faster unmount of a tape from a tape drive, the computer system comprising:
one or more computer processors;
one or more computer readable storage media;
computer program instructions;
the computer program instructions being stored on the one or more computer readable storage media for execution by the one or more computer processors; and
the computer program instructions including instructions to:
receive a request to unmount the tape from the tape drive, wherein the tape includes an index partition and a data partition;
determine that an update to the tape is not reflected in any data index written in the data partition;
append, in response to determining that the update to the tape is not reflected in any data index written in the data partition, a new data index at the end of the last written data file in the data partition, wherein the new data index includes information associated with the update to the tape;
unthread, after appending the new data index at the end of the last written data file in the data partition, the tape from the tape drive, wherein unthreading the tape from the tape drive comprises instructions to:
wind the tape to the end of the tape; and
wind the tape at a tension below a predetermined threshold from the end of the tape to the beginning of the tape; and
write a metadata index to an ancillary storage device, wherein the metadata index includes information associated with the update to the tape.

16. The computer system of claim 15, further comprising:
receive a request to export file system data associated with the tape and stored on the ancillary storage device; and
determine whether a current metadata index written to the index partition of the tape includes information associated with the update to the tape.

17. The computer system of claim 16, further comprising:
responsive to determining that the current metadata index written to the index partition of the tape does not include information associated with the update to the tape and prior to exporting the file system data stored on the ancillary storage device:
load the tape to the tape drive; and
overwrite the current metadata index written to the index partition of the tape with the metadata index stored on the ancillary storage device.

18. The computer system of claim 16, further comprising:
delete, responsive to determining that the current metadata index written to the index partition of the tape does include information associated with the update to the tape, the metadata index from the ancillary storage device.

19. The computer system of claim 15, wherein the ancillary storage device is a hard disk drive.

20. The computer system of claim 15, wherein winding the tape to the end of the tape includes winding the tape onto at least one tape drive reel.

\* \* \* \* \*